(12) United States Patent
Walther et al.

(10) Patent No.: US 9,580,356 B2
(45) Date of Patent: Feb. 28, 2017

(54) SELF-FOAMING GEOPOLYMER COMPOSITION CONTAINING ALUMINUM DROSS

(71) Applicant: Construction Research & Technology, GmbH, Trostberg (DE)

(72) Inventors: Burkhard Walther, Taching am See (DE); Bernhard Feichtenschlager, Traunstein (DE); Shengzhong Zhou, Shanghai (CN)

(*) Notice: Subject to any disclaimer, the term of this patent is extended or adjusted under 35 U.S.C. 154(b) by 0 days.

(21) Appl. No.: 15/030,462

(22) PCT Filed: Oct. 7, 2014

(86) PCT No.: PCT/EP2014/071390
§ 371 (c)(1),
(2) Date: Apr. 19, 2016

(87) PCT Pub. No.: WO2015/062819
PCT Pub. Date: May 7, 2015

(65) Prior Publication Data
US 2016/0257616 A1 Sep. 8, 2016

(30) Foreign Application Priority Data
Oct. 31, 2013 (EP) .................... 13190999

(51) Int. Cl.
C04B 28/00 (2006.01)
C04B 28/04 (2006.01)
C04B 28/06 (2006.01)
C04B 28/26 (2006.01)
C04B 38/10 (2006.01)

(52) U.S. Cl.
CPC ............ *C04B 28/006* (2013.01); *C04B 28/04* (2013.01); *C04B 28/06* (2013.01); *C04B 28/065* (2013.01); *C04B 28/26* (2013.01); *C04B 38/10* (2013.01); *Y02P 40/165* (2015.11); *Y02W 30/92* (2015.05); *Y02W 30/94* (2015.05)

(58) Field of Classification Search
CPC ...... C04B 28/006; C04B 28/06; C04B 28/065; C04B 28/26; C04B 28/04; C04B 38/10; C04B 7/00; C04B 7/32; C04B 7/323; C04B 12/04; C04B 14/047; C04B 14/066; C04B 14/106; C04B 14/14; C04B 14/22; C04B 18/08; C04B 18/081; C04B 18/141; C04B 18/146; C04B 22/062; C04B 22/10; C04B 22/126; C04B 24/38; C04B 2103/0088; C04B 2103/40
See application file for complete search history.

(56) References Cited

U.S. PATENT DOCUMENTS

| | | | |
|---|---|---|---|
| 3,396,112 | A | 8/1968 | Burrows |
| 5,244,726 | A | 9/1993 | Laney et al. |
| 2009/0229493 | A1 | 9/2009 | Kim et al. |
| 2010/0043674 | A1 | 2/2010 | Gaillard et al. |
| 2014/0030479 | A1 | 1/2014 | Christandl et al. |
| 2014/0047999 | A1 | 2/2014 | Razl |

FOREIGN PATENT DOCUMENTS

| | | | |
|---|---|---|---|
| DE | 102004006563 | | 9/2005 |
| DE | 202009001754 | | 7/2010 |
| EP | 2559532 | | 2/2013 |
| JP | 2001-240438 | A * | 9/2001 |
| WO | WO-9210440 | | 8/1992 |
| WO | WO-2008026006 | | 3/2008 |
| WO | WO-2012069024 | | 5/2012 |
| WO | WO-2013148843 | | 10/2013 |
| WO | WO-2013156852 | | 10/2013 |

OTHER PUBLICATIONS

International Search Report, PCT/EP2014/071390, Feb. 13, 2015.
International Written Opinion, PCT/EP2014/071390, Feb. 13, 2015.

* cited by examiner

*Primary Examiner* — Anthony J Green
(74) *Attorney, Agent, or Firm* — Curatolo Sidoti Co., LPA; Joseph G. Curatolo; Salvatore A. Sidoti

(57) ABSTRACT

The present invention relates to a self-foaming geopolymer composition comprising at least one hydraulic binder; at least one binder selected from latent hydraulic binders, pozzolanic binders, and mixtures thereof; at least one alkaline activator; and aluminum dross. It moreover relates to the use of that geopolymer composition for the production of geopolymer foams and/or foamed geopolymer products.

18 Claims, No Drawings

SELF-FOAMING GEOPOLYMER COMPOSITION CONTAINING ALUMINUM DROSS

CROSS REFERENCE TO RELATED APPLICATIONS

This application is a national stage application of International Application No. PCT/EP2014/071390, filed 7 Oct. 2014, which claims priority from European Patent Application No. 13190999.6, filed 31 Oct. 2013, which applications are incorporated herein by reference.

The present invention relates to a self-foaming geopolymer composition containing aluminum dross. It furthermore relates to the use of that geopolymer composition for the production of geopolymer foams and/or foamed geopolymer products.

Portland cement was first referred to in British Patent BP 5022, since which time it has undergone continual further development. It is nowadays considered one of the most important inorganic binders. Portland cement has a very high CaO content and hardens hydraulically.

Autoclaved lightweight concrete (marketed e.g. as Ytong®) is a lightweight, precast building material that simultaneously provides structure, insulation, and fire- and mold-resistance. For its manufacture, quartz sand, calcium carbonate, cement, water and a small amount of aluminum powder for foaming are mixed. The mixture is subsequently hardened with overheated steam.

Certain slags from metallurgical processes can be used in the form of latent hydraulic binders as admixtures to Portland cement. Also possible is their activation with strong alkalis, such as alkali metal hydroxides or waterglasses.

Inorganic binder systems based on reactive, water-insoluble compounds on the basis of $SiO_2$ in conjunction with $Al_2O_3$, which cure in an alkaline aqueous medium, are likewise common knowledge. Cured binder systems of this kind are also called "geopolymers" and are described for example in U.S. Pat. No. 4,349,386, WO 85/03699 and U.S. Pat. No. 4,472,199.

Reactive oxide mixtures employed in this context include metakaolin, microsilica, slags, fly ashes, activated clay, pozzolans or mixtures thereof. The alkali medium for activating the binders consists typically of aqueous solutions of alkali metal carbonates, alkali metal fluorides, alkali metal hydroxides, alkali metal aluminates and/or alkali metal silicates, such as soluble waterglass. In comparison to Portland cement, geopolymers may be more cost-effective and more stable, and may have a more favorable $CO_2$ emissions balance.

It would be desirable to produce lightweight geopolymer concrete elements like the aforementioned Ytong® elements. However, geopolymers exhibit distinct differences relative to the cementitious systems, these differences making it difficult to use aluminum powder as a foaming agent. This is because aqueous cementitious systems exhibit pH values of up to 12.5 while an aqueous suspension of a geopolymer composition exhibits pH values of up to 14. This higher level of alkalinity accelerates the foaming reaction of aluminum powder to such extent that the formed hydrogen gas will be lost long before the curing of the composition has commenced.

The problem addressed by the inventors was that of substantially avoiding at least some of the disadvantages of the prior art discussed above. Preferably the intention was to find a foaming agent for geopolymer compositions that was sufficiently slow and controllable. Moreover, the intention was to provide the self-foaming geopolymer composition of the invention. Furthermore, it was the inventors' intention to integrate waste stream materials in the geopolymer foam production. Finally, it was the inventors' intention to create fully non-burning (inorganic) sound and heat insulation materials at a low cost level.

The problems identified above are solved with the features of the independent claims. The dependent claims relate to preferred embodiments.

It was surprisingly found that aluminum dross is an ideal foaming agent for geopolymer compositions. "Aluminum dross" is a waste product of the aluminum processing industry, essentially consisting of oxides (such as $Al_2O_3$ and $SiO_2$) and nitrides, and 0.1 to 50% by weight of metallic aluminum distributed in the oxide and/or nitride matrix. Aluminum dross is generated for example during aluminum smelting and may strongly vary in terms of its metallic aluminum content. The deposition of aluminum dross in landfills can be an environmental problem while chemical recycling is quite expensive. In contrast thereto, aluminum dross thus constitutes a quite inexpensive foaming agent in the geopolymer compositions of the invention. Moreover, aluminum dross can serve as an additional aluminum source for the geopolymer compositions of the invention and is thus capable of at least partially replacing more expensive aluminum sources such as metakaolin.

The present invention provides a self-foaming geopolymer composition comprising at least one hydraulic binder; at least one binder selected from latent hydraulic binders, pozzolanic binders, and mixtures thereof; at least one alkaline activator; and aluminum dross.

"Self-foaming", as this term is used throughout the present specification, means that the geopolymer composition, once contacted with water, will develop a gas phase, i.e. hydrogen gas bubbles, that cause the composition to form a foamed composition. A "foam", as this term is used in the present specification, is a substance that is formed by trapping pockets or bubbles of gas in a liquid or solid phase. The foam can have open (connected) or closed (separate) gas cell structure.

The self-foaming geopolymer composition of the invention comprises at least one hydraulic binder. While the latent hydraulic binder and/or the pozzolanic binder in combination with the alkaline activator is/are necessary to form a geopolymer, the presence of a hydraulic binder serves the purpose of accelerating the hardening, i.e. the early strength development, that stabilizes the foam until the geopolymer curing reaction of the composition commences. Hydraulic binders alone would not require alkaline activators as they harden on contact with water.

In the self-foaming geopolymer composition of the invention the latent hydraulic binder is selected from industrial and/or synthetic slags, more particularly from blast furnace slag, electrothermic phosphorus slag, steel slag, and mixtures thereof.

The slags may be both industrial slags, i.e. waste products from industrial processes, and synthetically reproduced slags. The latter is advantageous, since industrial slags are not always available in sufficient quality and quantity.

For the purposes of the present invention, a latent hydraulic binder is preferably a binder in which the molar ratio of $(CaO+MgO):SiO_2$ is between 0.8 and 2.5 and more preferably between 1.0 and 2.0.

Blast furnace slag, a typical latent hydraulic binder, generally contains 30% to 45% by weight CaO, about 4% to 17% by weight MgO, about 30% to 45% by weight $SiO_2$ and about 5% to 15% by weight $Al_2O_3$, typically about 40% by weight CaO, about 10% by weight MgO, about 35% by weight $SiO_2$ and about 12% by weight $Al_2O_3$.

Blast furnace slag (BFS) is a waste product of the blast furnace process. Granulated blast furnace slag (GBFS) and ground granulated blast furnace slag (GGBSF), which is finely pulverized blast furnace slag, are different granulation and/or grinding degrees of blast furnace slag. The ground granulated blast furnace slag varies, according to origin and processing form, in its particle size and grain-size distribution, with the particle size affecting the reactivity. As a characteristic variable for the particle size, the figure known as the Blaine value is employed, which is typically in the order of magnitude of 200 to 1000, preferably between 300 and 500 $m^2\ kg^{-1}$. The finer the grind, the higher the reactivity.

Electrothermic phosphorus slag is a waste product from the production of phosphorus by electrothermic means. It is less reactive than blast furnace slag and contains about 45% to 50% by weight CaO, about 0.5% to 3% by weight MgO, about 38% to 43% by weight $SiO_2$, about 2% to 5% by weight $Al_2O_3$ and about 0.2% to 3% by weight $Fe_2O_3$, and also fluoride and phosphate.

Steel slag is a waste product from various steel manufacturing processes, with a highly varying composition (see Caijun Shi, Pavel V. Krivenko, Della Roy, Alkali-Activated Cements and Concretes, Taylor & Francis, London & New York, 2006, pp. 42-51).

For the purpose of the present invention, all different qualities, granulation and/or grinding degrees are meant to be comprised by the term "blast furnace slag". Blast furnace slag is the highly preferred latent hydraulic binder of the present invention.

In the composition of the invention the pozzolanic binder is preferably selected from amorphous silica, preferably precipitated silica, pyrogenic silica and microsilica, ground glass, fly ash, preferably brown-coal fly ash and mineral-coal fly ash, metakaolin, natural pozzolanas such as tuff, trass and volcanic ash, natural and synthetic zeolites, and mixtures thereof.

Pyrogenic silica, microsilica, fly ash, metakaolin, and mixtures thereof are preferred; metakaolin is most preferred.

Amorphous silica is preferably an X-ray-amorphous silica, i.e. a silica which exhibits no crystallinity in a powder diffraction procedure. The amorphous silica of the invention advantageously has an $SiO_2$ content of at least 80% by weight, preferably at least 90% by weight. Precipitated silica is obtained industrially via precipitation processes starting from waterglass. Depending on the manufacturing method, precipitated silica is also called silica gel. Pyrogenic silica is generated by reacting chlorosilanes, such as silicon tetrachloride, in an oxyhydrogen flame. Pyrogenic silica is an amorphous $SiO_2$ powder with a particle diameter of 5 to 50 nm and a specific surface area of 50 to 600 $m^2\ g^{-1}$.

Pyrogenic silica (sometimes also called "fumed silica") not only acts as a pozzolanic binder in the composition of the present invention, it can also act as a thixotropic agent. That means, it can stabilize the foam until the geopolymer curing reaction of the composition commences, thus preventing the loss of hydrogen gas and/or a separation or settling of the homogeneous geopolymer foam.

Microsilica is a by-product of silicon or ferrosilicon manufacture and likewise consists very largely of amorphous $SiO_2$ powder. The particles have diameters in the order of magnitude of 0.1 μm. The specific surface area is in the order of magnitude of 15 to 30 $m^2\ g^{-1}$. In contrast, commercial silica sand is crystalline and has comparatively large particles and a comparatively low specific surface area. In accordance with the invention it serves as an inert aggregate.

Fly ashes are formed in operations including the combustion of coal in power stations. Class C fly ash (brown coal fly ash) contains, according to WO 08/012438 about 10% by weight CaO, whereas class F fly ash (mineral coal fly ash) contains less than 8% by weight, preferably less than 4% by weight and typically about 2% by weight CaO. Fly ashes react only very slowly in geopolymer formulations and are thus not preferred.

Metakaolin is formed in the dehydrogenation of kaolin. Whereas kaolin gives off physically bound water at 100 to 200° C., dehydroxylation occurs at 500 to 800° C., with collapse of the lattice structure and formation of metakaolin ($Al_2Si_2O_7$). Pure metakaolin, accordingly, contains about 54% by weight $SiO_2$ and about 46% by weight $Al_2O_3$. It has been found that metakaolin gives best results in foamed geopolymer compositions. Metakaolin is thus the preferred pozzolanic binder of the present invention.

An overview of further pozzolanic binders suitable in accordance with the invention is found for example in Caijun Shi, Pavel V. Krivenko, Della Roy, Alkali-Activated Cements and Concretes, Taylor & Francis, London & New York, 2006, pp. 51-63. Testing for pozzolan activity can take place in accordance with DIN EN 196 Part 5.

The alkaline activator of the present invention is suitably selected from alkali metal carbonates, alkali metal fluorides, alkali metal hydroxides, alkali metal aluminates, alkali metal silicates, and mixtures thereof. Preferably it is selected from alkali metal hydroxides, alkali metal silicates, and mixtures thereof. The alkali metal is preferably selected from Li, Na, K and mixtures thereof.

According to one highly preferred embodiment, the alkali metal silicate is selected from compounds having the empirical formula m $SiO_2 \cdot n\ M_2O$, in which M is the alkali metal, preferably Li, Na, K or a mixture thereof, and the molar ratio of m:n is ≤4.0, preferably ≤3.0, more preferably ≤2.0, in particular ≤1.70, and most preferably ≤1.20.

The alkali metal silicate is preferably waterglass, more preferably an aqueous waterglass, and more particularly a sodium or potassium waterglass. Use may also be made, however, of lithium or ammonium waterglasses, and also of mixtures of the stated waterglasses.

The above-specified ratio m:n (also called "modulus") ought preferably not to be exceeded, since otherwise it is no longer likely that there will be any complete reaction of the components. It is also possible to employ lower moduli, such as around 0.2. Waterglasses having higher moduli ought before use to be adjusted to moduli in the range according to the invention, using a suitable aqueous alkali metal hydroxide.

Potassium waterglasses in the advantageous modulus range are commercialized primarily as aqueous solutions, being highly hygroscopic; sodium waterglasses in the advantageous modulus range are also available commercially as solids. The solids contents of the aqueous waterglass solutions are generally 20% by weight to 60% by weight, preferably 30% to 50% by weight.

Care should be taken, however, that the (alkaline) water content and the aluminum dross are contacted only shortly before the foaming reaction of the self-foaming geopolymer composition is desired. This may be done, for instance, by storing only anhydrous solid components and adding water when desired, or by storing the binder components and the aluminum dross as one component and adding a second component of aqueous waterglass when desired. It is also possible to store the binders, the aluminum dross and the aqueous waterglass as three separate components and mixing all components when desired.

Waterglasses can be prepared industrially by melting silica sand with the corresponding alkali metal carbonates. Alternatively they may also be obtained without difficulty from mixtures of reactive silica with the corresponding aqueous alkali metal hydroxides. In accordance with the invention, therefore, it is possible to replace at least part of the alkali metal silicate by a mixture of a reactive silica and the corresponding alkali metal hydroxide.

As mentioned above, aluminum dross is a waste product of the aluminum processing industry, essentially consisting of oxides (such as $Al_2O_3$ and $SiO_2$) and nitrides, and 0.1 to 50% by weight of metallic aluminum distributed in the oxide and/or nitride matrix. The matrix, as a rule, contains mainly oxides. The proportion of the oxides and/or nitrides is 50 to 99.9% by weight.

In a preferred embodiment of the invention the aluminum dross comprises 75 to 99% by weight oxides and/or nitrides, and 1 to 25% by weight metallic aluminum, preferably 85 to 99% by weight oxides and/or nitrides, and 1 to 15% by weight metallic aluminum. The oxides preferably comprise $Al_2O_3$ and $SiO_2$.

As mentioned above, in the composition of the present invention at least one hydraulic binder may be present. The hydraulic binder is preferably selected from portland cement, high alumina cement, calcium sulphoaluminate cement, portland composite cement according to classes CEM II to V, and mixtures thereof.

Portland cement (CEM I) is most preferred. It is probably the best-known hydraulic binder. Modern portland cement contains about 70 wt % CaO+MgO, about 20 wt % $SiO_2$ and about 10 wt % $Al_2O_3+Fe_2O_3$.

The composite cements are based on portland cement and various co-components, the composition of these cements being regulated in DIN EN 197-1, Table 1, and the cements themselves being assigned to cement classes CEM II: portland composite cement, CEM III: blast furnace cement, CEM IV: pozzolanic cement and CEM V: composite cement. Co-components used include slag sand, fly ash, pozzolan, trass, silica dust, limestone, etc.

In order to further stabilize the foam until the geopolymer curing reaction of the composition of the present invention commences, the composition may further comprise a surfactant. Several classes of surfactants can be advantageously used, such as anionic surfactants, cationic surfactants and non-ionic surfactants, the latter ones being much preferred. Also mixtures of surfactants are possible. Most preferred, however, are non-ionic surfactants of the alkyl polyglucoside type because these surfactants are particularly useful in stabilizing gas bubbles in geopolymer compositions and work well in foam stabilization even in the presence of waterglass and high alkalinity levels.

Alkyl polyglucosides usually have the formula $H-(C_6H_{10}O_5)_m-O-R^1$, wherein $(C_6H_{10}O_5)$ stands for a glucose unit, $R^1$ stands for a $C_{6-22}$ alkyl group, preferably a $C_{8-16}$ alkyl group and in particular for a $C_{8-12}$ alkyl group, and m=1 to 10, preferably 1 to 5.

The composition of the present invention, shortly before the start of foaming reaction is desired, must be contacted with water. It is thus an embodiment of the present invention that the composition of the invention also comprises water. As a matter of consequence, after the composition of the present invention is contacted with water it will also comprise a gas phase essentially comprising hydrogen gas. Due to the use of aluminum dross instead of powdered aluminum the foaming will commence with some delay because the oxide matrix must first be dissolved by the alkaline medium of the composition. Still, contacting with water should be the last step of preparing this composition.

It was mentioned above that the metallic aluminum content of aluminum dross strongly varies. Although the composition of the present invention is capable of absorbing varying degrees of oxides in the aluminum dross because these oxides also function as binders, the amount of metallic aluminum is more critical. It was found most beneficial that the molar ratio of metallic aluminum to alkali metal (Al/M) is ≤0.3, preferably ≤0.2 and in particular ≤0.1.

Further additives for foam stabilization such as fumed silica, proteins, rheology modifying agents such as starches, modified starches, sulfo and/or quaternized ammonium group carrying poly(meth)acrylates and poly(meth)acrylamides, as well as mixtures thereof, additives for shrink reduction, such as amines, lactames, betaine(s), alkanolamines, glycols and/or polyols, additives for flexibilization, such as re-dispersible polymer powders, polyisocyanates, polyisocyanate prepolymers, epoxy resins, aqueous epoxy formulations, (film forming) acrylate dispersions, as well as mixtures thereof, fibers, such as stone fibers (e.g. basalt fibers), glass fibers, carbon fibers, optionally modified organic fibers (PE, PP, PVA, PAN, polyester, polyamide, etc.), cellulose fibers, lignocellulose fibers, metal fibers (iron, steel, etc.), as well as mixtures thereof, hydrophobization agents, such as triglycerides, polysiloxanes, hydrogen silanes, alkoxysilanes, as well as mixtures thereof, and dispersants, such as comb-like polymers, e.g. comb-like polycarboxylate ethers, comb-like polyaromatic ethers, comb-like cationic copolymers, as well as mixtures thereof, can be successfully applied within this system. Also fillers such as quartz sand, calcium carbonate, ground stone powder, light-weight fillers, such as vermiculite, perlite, diatomaceous earth, mica, talcum, magnesia, foamed glass, hollow glass spheres, hollow aluminosilicate spheres, pigments, such as titanium dioxide, heavy-weight fillers, such as barium sulfate, metal salts, such as zinc salts, calcium salts, etc., as well as mixtures thereof, can be successfully added to this system.

A particularly preferred composition of the present invention comprises, in addition to its main components, 0.1 to 2.0% b.w. of ε-caprolactam for shrink reduction, 1.0 to 3.0% b.w. of polyvinylalcohol fibers, and 0.5 to 3.0% b.w. of a re-dispersible polymer powder for flexibilization.

Finally, the present invention provides the use of the geopolymer composition of the invention for the production of geopolymer foams and/or foamed geopolymer products.

The present invention is now explained in more detail by means of the examples hereinbelow.

EXAMPLES

General Remarks:

A typical composition of the aluminum dross type "CAI-Alon B" (Cast Aluminium Industries, Dubai, UAE) was as follows [% by weight]:

| | |
|---|---|
| Al (metallic) | 13.7 |
| N | 4.3 |
| $Al_2O_3$ | 73.0 |
| $SiO_2$ | 4.0 |
| CaO | 3.1 |
| MgO | 1.5 |
| $Fe_2O_3$ | 0.4 |

A typical composition of the aluminum dross type "CAI-Alon S" (Cast Aluminium Industries, Dubai, UAE) was as follows [% by weight]:

| | |
|---|---|
| Al (metallic) | 10.9 |
| N | 4.3 |
| $Al_2O_3$ | 75.0 |
| $SiO_2$ | 3.9 |
| CaO | 3.7 |
| MgO | 1.8 |
| $Fe_2O_3$ | 0.4 |

The basic formulation is a two component system where the liquid components and the solid components are mixed together. The shelf life of the separate components is thus very high. Percentages are given in percent by weight. The quantities shown hereinbelow are calculated for small sample specimens for compressive strength measurement. For preparation of plate specimens for lambda value measurements the quantities given below must be multiplied by the factor of 5.3.

The lambda values are given in mW/(m*K). The Instrument for lambda value measurement was a Lambda-Meter EP500 according to EN 1946-2 from Lambda-Messtechnik GmbH, Dresden, Germany. The thickness of the test specimen was measured according to EN 823, and the heat conductivity measurement was performed according to ISO 8320/EN 12667 at a pressure of 1000 Pa.

Compressive strength was measured on a "MEGA 110-300DM1" instrument from FORM+TEST Seidner & Co. GmbH, Riedlingen. Values are given in $N/mm^2$. The testing velocity was 1.5 $N/mm^2$ per second.

Example 1a

| | |
|---|---|
| 27.0 g | Potassium waterglass K45M (Woellner GmbH&Co KG, 40.5% solids, mod. 1.0) |
| 15.4 g | Distilled water |
| 0.5 g | Triton ® CG 110 (Dow Chemicals, $C_{8-10}$ alkyl polyglucoside surfactant, m = 1-5) |
| 15.4 g | Metakaolin (Argical ® 1200 S, AGS SA Clerac) |
| 10.4 g | Mineral Coal Fly Ash (L-10, Evonik Industries) |
| 3.8 g | Portland Cement (CEM I, Schwenk Zement KG, Mergelstetten) |
| 1.9 g | Tegostab ® B 8407 (Evonik Industries, silicone oil-based surfactant) |
| 1.0 g | Aerosil ® 200 (Evonik Industries, pyrogenic silica) |
| 6.0 g | CAI-Alon B (aluminum dross) | were blended. The pot-life was 10 min. Foaming completed after 35 min. A stable foam was obtained after curing for 24 h. After water removal (drying to weight constancy) the foam density was 302 g/l.

Example 1b (Comparative)

| | |
|---|---|
| 27.0 g | Potassium waterglass K45M (Woellner GmbH&Co KG, 40.5% solids, mod. 1.0) |
| 15.4 g | Distilled water |
| 0.5 g | Triton ® CG 110 (Dow Chemicals, alkyl polyglucoside surfactant) |
| 15.4 g | Metakaolin (Argical ® 1200 S, AGS SA Clerac) |
| 10.4 g | Mineral Coal Fly Ash (L-10, Evonik Industries) |
| 0.0 g | Portland Cement |
| 1.9 g | Tegostab ® B 8407 (Evonik Industries, silicone oil-based surfactant) |
| 1.0 g | Aerosil ® 200 (Evonik Industries, pyrogenic silica) |
| 6.0 g | CAI-Alon B (aluminum dross) | were blended. The pot-life was 10 min. Foaming completed after 18 minutes. After these 18 minutes the foam started immediately to collapse and collapse was completed after 30 min. After 24 h only powder is yielded, no hardened foam.

Example 2

| | |
|---|---|
| 27.0 g | Potassium waterglass K45M |
| 15.4 g | Distilled water |
| 0.5 g | Triton ® CG 110 (Dow Chemicals, alkyl polyglucoside surfactant) |
| 15.4 g | Metakaolin (Argical ® 1200 S, AGS SA Clerac) |
| 10.4 g | Mineral Coal Fly Ash (L-10, Evonik Industries) |
| 3.8 g | Portland Cement (CEM I, Schwenk Zement KG, Mergelstetten) |
| 4.0 g | Kieselgel 60, (0.04-0.063 mm, 230-400 mesh, Carl Roth GmbH + Co. KG) |
| 6.0 g | CAI-Alon B (aluminum dross) | were blended. The pot-life was 10 min. Foaming completed after 35 min.

Example 3

| | |
|---|---|
| 27.0 g | Potassium waterglass K45M |
| 15.4 g | Distilled water |
| 0.5 g | Triton ® CG 110 (Dow Chemicals, alkyl polyglucoside surfactant) |
| 15.4 g | Metakaolin (Argical ® 1200 S, AGS SA Clerac) |
| 10.4 g | Aluminosilicate hollow spheres (Fillite ® 106, OMYA GmbH) |
| 3.8 g | Portland Cement (CEM I, Schwenk Zement KG, Mergelstetten) |
| 4.0 g | Kieselgel 60 (0.04-0.063 mm, 230-400 mesh, Carl Roth GmbH + Co. KG) |
| 4.0 g | CAI-Alon B (aluminum dross) | were blended. The pot-life was 15 min. Foaming completed after 35 min.

Example 4

| | |
|---|---|
| 27.0 g | Potassium waterglass K45M |
| 15.4 g | Distilled water |
| 0.5 g | Triton ® CG 110 (Dow Chemicals, alkyl polyglucoside surfactant) |
| 15.4 g | Metakaolin (Argical ® 1200 S, AGS SA Clerac) |
| 10.4 g | Mineral Coal Fly Ash (L-10, Evonik Industries) |
| 3.8 g | Portland Cement (CEM I, Schwenk Zement KG, Mergelstetten) |
| 1.9 g | Tegostab ® B 8407 (Evonik Industries, silicone oil-based surfactant) |
| 4.0 g | Kieselgel 60 (0.04-0.063 mm, 230-400 mesh, Carl Roth GmbH + Co. KG) |
| 6.0 g | CAI-Alon S (aluminum dross) | were blended. The pot-life was 6 min. Foaming completed after 25 min.

Example 5

| | |
|---|---|
| 27.0 g | Sodium waterglass Betol ® 39T (Woellner GmbH&Co KG, calculated as solids) |
| 15.4 g | Distilled water |
| 0.5 g | Triton ® CG 110 (Dow Chemicals, alkyl polyglucoside surfactant) |
| 15.4 g | Metakaolin (Argical ® 1200 S, AGS SA Clerac) |
| 10.4 g | Mineral Coal Fly Ash (L-10, Evonik Industries) |
| 3.8 g | Portland Cement (CEM I, Schwenk Zement KG, Mergelstetten) |
| 4.0 g | Kieselgel 60 (0.04-0.063 mm; 230-400 mesh, Carl Roth GmbH + Co. KG) |
| 4.0 g | CAI-Alon B | were blended. The pot-life was 12 min. Foaming completed after 30 min.

Example 6

| | |
|---|---|
| 27.0 g | Potassium waterglass K45M |
| 15.4 g | Distilled water |
| 0.5 g | Triton ® CG 110 (Dow Chemicals, alkyl polyglucoside surfactant) |
| 15.4 g | Metakaolin (Argical ® 1200 S, AGS SA Clerac) |
| 10.4 g | Mineral Coal Fly Ash (L-10, Evonik Industries) |
| 10.4 g | Blast furnace slag (Heidelberger Hüttensand SLAG SH 20, HeidelbergCement AG) |
| 3.8 g | Portland Cement (CEM I, Schwenk Zement KG, Mergelstetten) |
| 4.0 g | Kieselgel 60 (0.04-0.063 mm, 230-400 mesh, Carl Roth GmbH + Co. KG) |
| 4.0 g | CAI-Alon B | were blended. The pot-life was 5 min. Foaming completed after 20 min.

Example 7

| | |
|---|---|
| 27.0 g | Potassium waterglass K45M |
| 15.4 g | Distilled water |
| 0.5 g | Triton ® CG 110 (Dow Chemicals, alkyl polyglucoside surfactant) |
| 15.4 g | Metakaolin (Argical ® 1200 S, AGS SA Clerac) |
| 10.4 g | Mineral Coal Fly Ash (L-10, Evonik Industries) |
| 3.8 g | Portland Cement (CEM I, Schwenk Zement KG, Mergelstetten) |
| 4.0 g | Hollow glass spheres S22 (OMYA) |
| 4.0 g | CAI-Alon B (aluminum dross) | were blended. The pot-life was 10 min. Foaming completed after 35 min.

Example 8

| | |
|---|---|
| 27.0 g | Sodium waterglass Betol ® 39T |
| 15.4 g | Distilled water |
| 0.5 g | Triton ® CG 110 (Dow Chemicals, alkyl polyglucoside surfactant) |
| 15.4 g | Metakaolin (Argical ® 1200 S, AGS SA Clerac) |
| 10.4 g | Mineral Coal Fly Ash (L-10, Evonik Industries) |
| 3.8 g | Portland Cement (CEM I, Schwenk Zement KG, Mergelstetten) |
| 1.0 g | Aerosil ® 200 (Evonik Industries, pyrogenic silica) |
| 6.0 g | CAI-Alon B | were blended. The pot-life was 10 min. Foaming completed after 30 min.

Example 9 (Comparative)

| | |
|---|---|
| 27.0 g | Potassium waterglass K45M (Woellner GmbH&Co KG, 40.5% solids, mod. 1.0) |
| 15.4 g | Distilled water |
| 0.5 g | Triton ® CG 110 (Dow Chemicals, alkyl polyglucoside surfactant) |
| 15.4 g | Metakaolin (Argical ® 1200 S, AGS SA Clerac) |
| 10.4 g | Mineral Coal Fly Ash (L-10, Evonik Industries) |
| 3.8 g | Portland Cement (CEM I, Schwenk Zement KG, Mergelstetten) |
| 1.9 g | Tegostab ® B 8407 (Evonik Industries, silicone oil-based surfactant) |
| 1.0 g | Aerosil ® 200 (Evonik Industries, pyrogenic silica) |
| 720 mg | Aluminum Powder (Sigma Aldrich, <5 micrometer) |
| 5.28 g | $Al_2O_3$ Powder (Sigma Aldrich, puriss.) | were blended. The pot-life was only 5 sec. Foaming completed after 5 min. No stable foamed material could be obtained.

A comparison of the formulations of Examples 1a (inventive) and 1b (comparative) shows that without the presence of a hydraulic binder (here: Portland Cement) no hardened foam could be obtained. A comparison of the formulations of Examples 1a and 2 demonstrates that a certain foaming behavior and foaming degree could be achieved from different compounds via targeted formulation. The formulation of Example 3 demonstrates that fly ash could be replaced by a silicate based binder/filler (Fillite®). The formulation of Example 4 demonstrates the robustness of the foaming process, i.e. the system was not sensitive towards slight changes in composition of the aluminum dross. The formulation of Example 5 shows that the use of sodium water glass instead of potassium water glass was also possible. The formulation of Example 6 demonstrates the versatility of applicable raw materials, e.g. fly ash could be replaced by blast furnace slag. The formulation of Example 7 shows that through the use of additional light weight filler components, such as hollow glass spheres, the thermal insulation property of the final material could be further improved (see Table 1 below).

The comparative Example 9 demonstrates that aluminum must be present in the form of aluminum dross. Otherwise no useful pot-life and no stable foamed material is obtained.

Example 10

A typical thermal insulation plate was prepared via the following procedure. First, the solid compounds containing the aluminum dross, the hydraulic binder, the geopolymer binder and solid additives and the liquid compounds containing water glass, surfactant and liquid additives were mixed together. Then, the mixture was poured into a mold. After a certain time period the mixture started to foam ("pot-life"). The foaming was completed after another time period (given in Examples 1-8) ending up with a wet inorganic foam. After the foaming was completed the plate was cured. The curing took place in a closed or opened mold between 0° C. and 100° C. in dry or 100% humid air. Depending on the curing conditions, the thermal insulation coefficient and compressive strength, the most important parameters characterizing the performance of the panel, varied. Typically, however, the mixture was covered after foaming with a plastic foil to reduce evaporation, the mixture was then allowed to stand for 24 h at room temperature, 24 h at 40° C., was heated in 10° C./4 h steps to 80° C., and was then removed from the mold. It was further stored 24 h at 80° C. for complete drying.

Plates with the dimensions of 280×285×55 mm, which have been used for lambda-value measurements, and cubes with 30 mm dimension, which have been used for compressive strength measurements, were produced form the formulations of Examples 1-8. (In lager batches as used for plate production the temperature increased by about 10° C. due to exothermic reactions.) The properties of some formulations and specimens are given in Table 1 below.

TABLE 1

| | Example: | | | |
|---|---|---|---|---|
| | 1a | 2 | 7 | 8 |
| Density [kg/m$^3$] | 302 | 290 | 229 | 284 |
| Lambda value [mW/(m * K)] | 60 | 63 | 55 | 61 |
| Compressive strength [kN/mm$^2$] | 0.2 | 0.2 | 0.3 | 0.4 |

The invention claimed is:

1. A self-foaming geopolymer composition comprising:
   at least one hydraulic binder, wherein the hydraulic binder is selected from portland cement, high alumina cement, calcium sulphoaluminate cement, portland composite cement according to classes CEM II to V, and mixtures thereof;
   at least one binder selected from latent hydraulic binders, pozzolanic binders, and mixtures thereof;
   at least one alkaline activator; and
   aluminum dross.

2. The composition of claim 1, wherein the latent hydraulic binder is selected from blast furnace slag, electrothermic phosphorus slag, steel slag, and mixtures thereof.

3. The composition of claim 1, wherein the latent hydraulic binder is blast furnace slag.

4. The composition of claim 1, wherein the pozzolanic binder is selected from amorphous silica, precipitated silica, pyrogenic silica, microsilica, ground glass, fly ash, brown-coal fly ash, mineral-coal fly ash, metakaolin, natural pozzolanas, tuff, trass, volcanic ash, natural zeolites, synthetic zeolites, and mixtures thereof.

5. The composition of claim 4, wherein the pozzolanic binder is selected from pyrogenic silica, microsilica, fly ash, metakaolin, and mixtures thereof.

6. The composition of claim 5, wherein the pozzolanic binder is metakaolin.

7. The composition of claim 1, wherein the alkaline activator is selected from alkali metal carbonates, alkali metal fluorides, alkali metal hydroxides, alkali metal aluminates, alkali metal silicates, and mixtures thereof.

8. The composition of claim 7, wherein the alkaline activator is selected from alkali metal hydroxides, alkali metal silicates, and mixtures thereof.

9. The composition of claim 8, wherein the alkali metal silicate is selected from compounds having the empirical formula in SiO$_2$.n M$_2$O, in which M is the alkali metal, Li, Na, K or a mixture thereof, and the molar ratio of m:n is ≤4.0.

10. The composition of claim 1, wherein the aluminum dross comprises 50 to 99.9% by weight oxides and/or nitrides, and 0.1 to 50% by weight metallic aluminum.

11. The composition of claim 10, wherein the aluminum dross comprises 75 to 99% by weight oxides and/or nitrides, and 1 to 25% by weight metallic aluminum.

12. The composition of claim 11, wherein the oxides comprise Al$_2$O$_3$ and SiO$_2$.

13. The composition of claim 1, wherein the hydraulic binder is portland cement.

14. The composition of claim 1, further comprising a surfactant.

15. The composition of claim 14, wherein the surfactant is an alkyl polyglucoside.

16. The composition of claim 1, further comprising water.

17. The composition of claim 16, further comprising a gas phase comprising hydrogen gas.

18. The composition of claim 1, wherein the molar ratio of metallic aluminum to alkali metal (Al/M) is ≤0.3.

* * * * *